United States Patent

Utsumi et al.

[11] Patent Number: 6,002,085
[45] Date of Patent: Dec. 14, 1999

[54] GAS INSULATED SWITCHGEAR

[75] Inventors: Tomoaki Utsumi; Toshio Ishikawa; Shuzo Iwaasa; Fumihiro Endo; Tokio Yamagiwa, all of Hitachi, Japan

[73] Assignee: Hitachi, Ltd., Tokyo, Japan

[21] Appl. No.: 08/351,743

[22] Filed: Dec. 8, 1994

Related U.S. Application Data

[63] Continuation of application No. 07/978,342, Nov. 18, 1992, abandoned.

[30] Foreign Application Priority Data

Nov. 18, 1991 [JP] Japan .................................... 3-301542

[51] Int. Cl.$^6$ ........................................................ H01B 7/00
[52] U.S. Cl. ........................ 174/28; 174/137 A; 361/604
[58] Field of Search ............................ 174/17 GF, 26 G, 174/28, 140 C, 142, 167, 168, 137 A, 137 B; 200/148 R; 361/604, 612, 618

[56] References Cited

U.S. PATENT DOCUMENTS

| | | | |
|---|---|---|---|
| 3,582,586 | 6/1971 | Jones | 174/137 B X |
| 4,001,128 | 1/1977 | Penneck | 174/137 B X |
| 4,177,322 | 12/1979 | Homan et al. | 174/137 A X |
| 4,476,155 | 10/1984 | Niemi | 174/137 A X |
| 4,688,142 | 8/1987 | Hjortsberg et al. | 361/332 |
| 4,818,825 | 4/1989 | Ishikawa et al. | 174/212 |

FOREIGN PATENT DOCUMENTS

| | | | |
|---|---|---|---|
| 0066298 | 12/1982 | European Pat. Off. | H01H 33/02 |
| 3634946 | 4/1987 | Germany | H02G 5/06 |
| 2134534 | 8/1984 | United Kingdom | 174/137 A |

OTHER PUBLICATIONS

Low Dielectric Constant Epoxy Resin Insulator For $SF_6$ Gas Insulated Switch Gear EIM 88 33, IEE Japan, May 26, 1988.

*Primary Examiner*—David P. Bryant
*Attorney, Agent, or Firm*—Antonelli, Terry, Stout & Kraus, LLP

[57] ABSTRACT

A gas insulated switchgear has a container which is filled with an insulating gas, a conductor disposed with the container, an insulator for supporting the conductor. An outer periphery of the insulator is made smooth so as to improve a dielectric strength of the device. The insulator is made of an organic substance base and an inorganic material filler added to the base. In order to improve the dielectric strength, the filler is atomised or the insulator is coated.

9 Claims, 5 Drawing Sheets

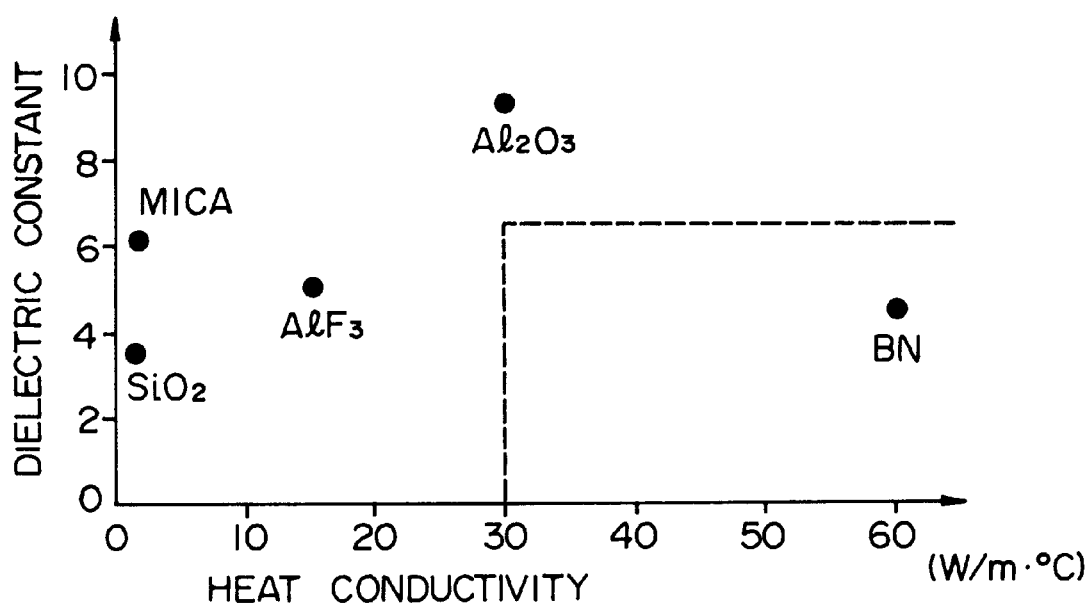
F I G. 9

GAS INSULATED SWITCHGEAR

This application is a Continuation of application Ser. No. 07/978,342, filed Nov. 18, 1992, now abandoned.

FIELD OF THE INVENTION AND RELATED ART STATEMENT

The present invention relates to a gas insulated switchgear, and more particularly to a gas insulated switchgear including an insulator for supporting a conductor applied with a higher voltage in an insulating manner.

A conventional gas insulated switchgear of the above type includes a grounded metal container filled with an insulating gas such as $SF_6$ gas, in which a conductor applied with a higher voltage is supported in an insulating manner by an insulator spacer. In order to improve a dielectric strength, in such conventional gas insulated switchgear, the insulator spacer is made of epoxy resin base and an filler added to the base, which filler includes alumina (dielectric constant of 9.3) or a mixture of aluminium fluoride (dielectric constant of 5.0) and alumina. According to this, the dielectric constant of the insulator spacer is reduced, thereby preventing the deterioration of the dielectric strength due to an electrostatic concentration induced by the shape of the spacer.

In the conventional gas insulated switchgear, in order to improve the insulator spacer's own dielectric strength, it is made of a base material and a filler added thereto. However, it has not been considered that the filler makes a surface of the spacer rough to deteriorate the dielectric strength thereof. Namely, the added filler affects the surface roughness of the spacer. Accordingly, for example, the conductive foreign matters remaining in the gas insulated switchgear and/or brought from the internal elements of the gas insulated switchgear can be readily attached to such rough surface of the spacer. As a result, the electrostatic concentration may be locally generated on such rough surface, thereby causing dielectric breakdown.

OBJECT AND SUMMARY OF THE INVENTION

An object of the present invention is to provide a gas insulated switchgear which has a high dielectric strength even when there are conductive foreign matters present.

To this end, the present invention provides a gas insulated device comprising a container filled with an insulating gas, a conductor disposed within the container, and an insulator for supporting the conductor in the container, the insulator having a smooth outer peripheral surface.

According to the present invention, since a surface roughness of the insulator is reduced, thereby preventing a local electrostatic concentration, the dielectric strength of the insulator can be improved even when conductive foreign matter adheres to the surface of the insulator.

BRIEF DESCRIPTION OF THE DRAWINGS

FIG. 9 is a graph showing a dielectric constant and a heat transfer coefficient of the respective additives.

DETAILED DESCRIPTION OF PREFERRED EMBODIMENTS

Figure 1:
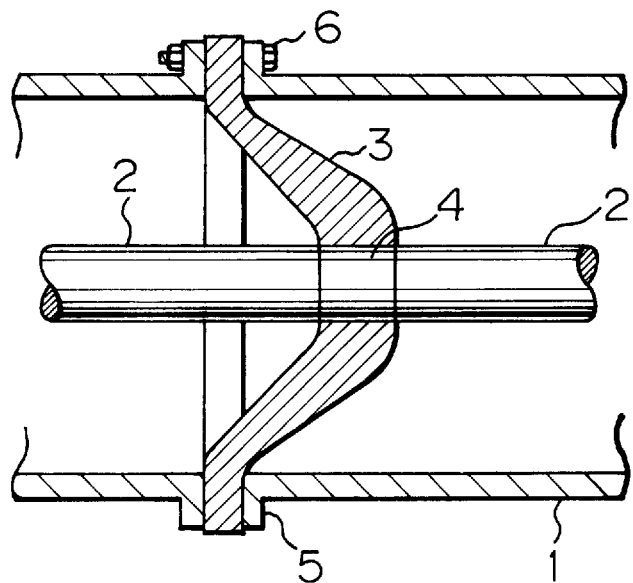
FIG. 1 is a sectional view showing a gas insulated switchgear according to one embodiment of the present invention.

Referring to FIG. 1, a gas insulated switchgear according to one embodiment includes a grounded metal container 1 filled with an insulating gas such as $SF_6$ gas, conductors 2 applied with a higher voltage which are disposed within the container 1, a connector conductor 4 connecting the conductors 2 with each other, and a truncated cone shaped insulator spacer 3 in which the connector conductor 4 is embedded. The container consists of a pair of container halves, each of which is provided with a flange portion, respectively. The container halves are so assembled together that an outer periphery of the insulator spacer 3 is interposed between the flange portions which are fixed together by means of bolts 6.

The insulator spacer 3 is made of an organic substance base, such as epoxy resin, to which an inorganic filler, for example a mixture of aluminium fluoride and alumina, is added in an amount of 35 volume percent to 60 volume percent. The filler is added to the base so as to make a coefficient of thermal expansion of the spacer 3 closer to that of the connecting conductor 4. According to this, a thermal concentration is reduced, thereby preventing the spacer 3 from cracking.

Figure 2:
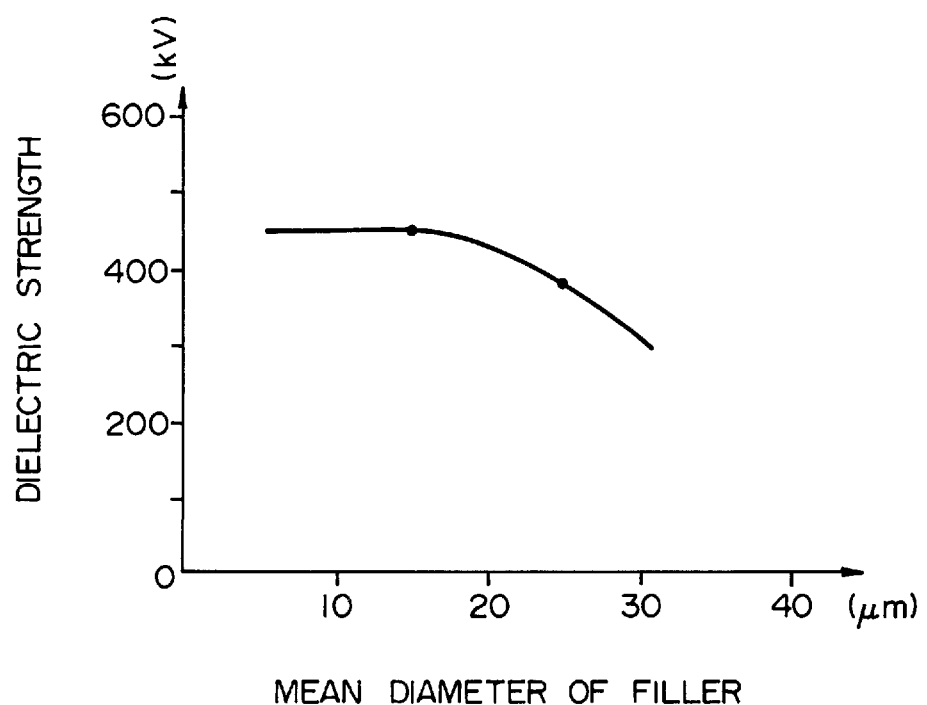
FIG. 2 is a graph showing a characteristic relationship between the mean diameter of the filler and the dielectric strength.

The mean diameter of the filler is 15 μm or less. As apparent from FIG. 2, the smaller the mean diameter of the filler becomes, the higher the dielectric strength becomes. When the mean diameter of the filler becomes 15 μm or less, the dielectric strength becomes saturated. Namely, when a filler of 15 μm or less mean diameter is added to the base of the spacer 3, the surface roughness of the spacer 3 becomes small and then the electrostatic concentration induced by the surface roughness of the spacer 3 is substantially decreased as compared with that induced by conductive foreign matter attached to the spacer 3. The results shown in FIG. 2 are obtained under the condition where conductive foreign matter of some millimeters is adhered to a surface of the spacer 3 made of epoxy resin base to which a mixture of aluminium fluoride and alumina is added.

Figure 3:
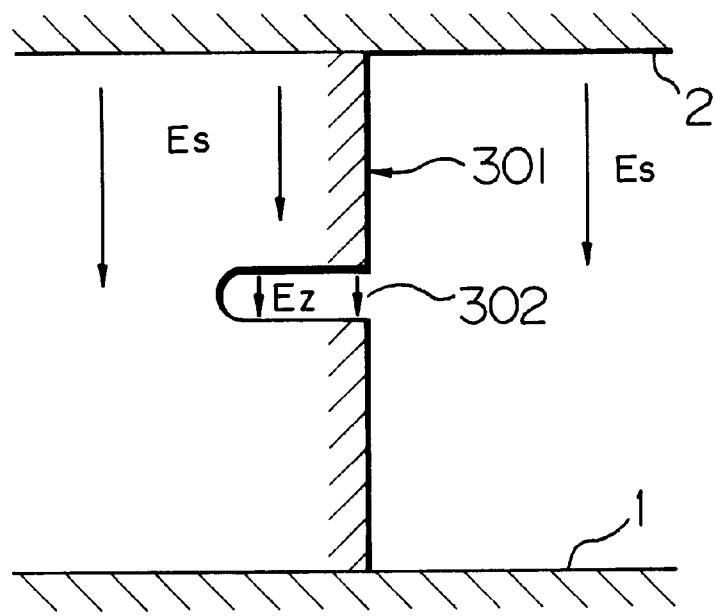
FIG. 3 is a schematic view showing an electrostatic concentration caused or induced by the roughness of the insulator spacer's surface.

The explanation of the reduction of the electrostatic concentration mentioned above will be made by referring to FIG. 3. In case that the surface of the spacer 301 is rough, for example, there is a recess 302 on the surface of the spacer 301 due to lack of filler, a local electrostatic concentration Ez is induced in the recess 302. A flux density in the recess 302 is $e_0 \times Ez$, which is substantially identical to a flux density $e_s \times e_0 \times Es$ in the spacer 301. The coefficients $e_0$ and $e_s$ represent dielectric constants of space filled with the insulating gas and of the insulator spacer, respectively. It is found that an electric field Ez in the recess 302 is $e_s$ times higher than an electric field Es in the remaining part. Under such condition, if conductive foreign matter is adhered around the recess 302, the electrostatic concentration induced by such foreign matter is superimposed upon the electrostatic concentration induced by the recess 302 so as to generate an extremely high electrostatic concentration which leads to dielectric breakdown, thereby deteriorating the dielectric strength of the spacer 302. To the contrary, according to the present invention, the spacer 3 is so smooth as to eliminate the recesses from the surface thereof. Accordingly, high electrostatic concentration can be eliminated, thereby improving the dielectric strength of spacer 3.

The filler is not limited to a mixture of an aluminium fluoride ($AlF_3$) and alumina ($Al_2O_3$). The filler may be aluminium fluoride, boron nitride (BN), or a mixture of alumina and boron nitride. The filler may be atomized. Further, the insulator spacer is not limited to a truncated cone shaped one. A barrel shaped insulator spacer or a disk shaped one may be employed. A frilled insulator spacer may be also employed, which has an improved dielectric strength.

Figure 4:
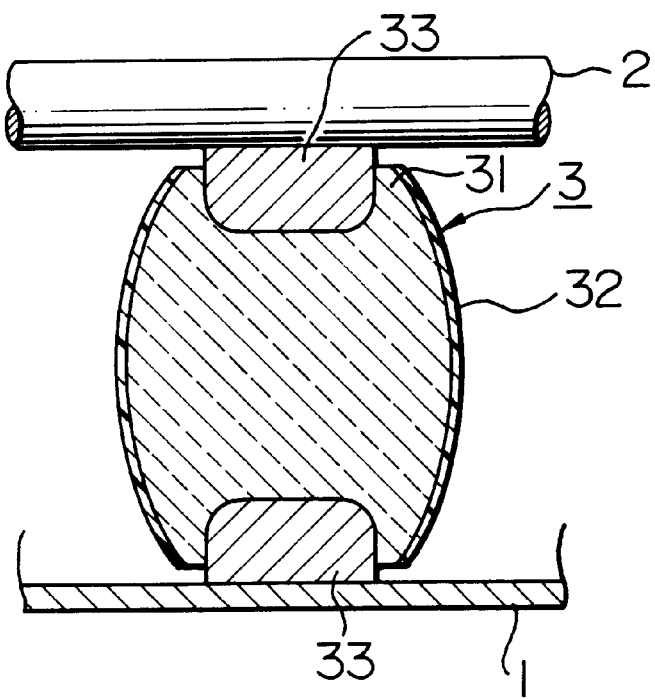
FIG. 4 is a sectional view showing a gas insulated switchgear according to another embodiment of the present invention.

FIG. 4 shows a barrel shaped insulator spacer 3 used in another embodiment of the present invention. The spacer 3 includes an epoxy resin base 31 to which an inorganic material filler is added, and an epoxy resin coating layer 32. The coating layer 32 makes an outer surface of the insulator spacer 3 more smooth. Therefore, even though conductive foreign matters are adhered to the insulator spacer 3, electrostatic concentration does not occur, thereby improving the dielectric strength of the spacer 3. In this case, a filler whose mean diameter is 15 $\mu$m or more can be employed. The spacer 3 further includes metal fittings 33 for mounting the spacer 3 to the container.

The process for molding the above-mentioned insulator spacer 3 will be described hereinafter.

A mold is coated at an inner surface thereof with an epoxy resin which serves as the coating layer 32. Thereafter, an epoxy resin to which a filler is added is injected into the mould.

In this embodiment, silicon dioxide ($SiO_2$) can be employed as a filler so as to lower the cost of the spacer. Generally, since silicon dioxide is readily deteriorated by $SF_6$ gas, it is hardly employed as a filler. However, in this embodiment, the coating layer prevents the spacer from being exposed to $SF_6$ gas, and therefore the silicon dioxide filler can be employed.

As described above, the dielectric strength of the spacer can be improved by reducing the surface roughness thereof. Further, when the surface roughness is maintained under the level of 15 $\mu$m in the terms of an arithmetical mean deviation from the mean line of the profile, the dielectric strength is improved sufficiently.

Figure 5:
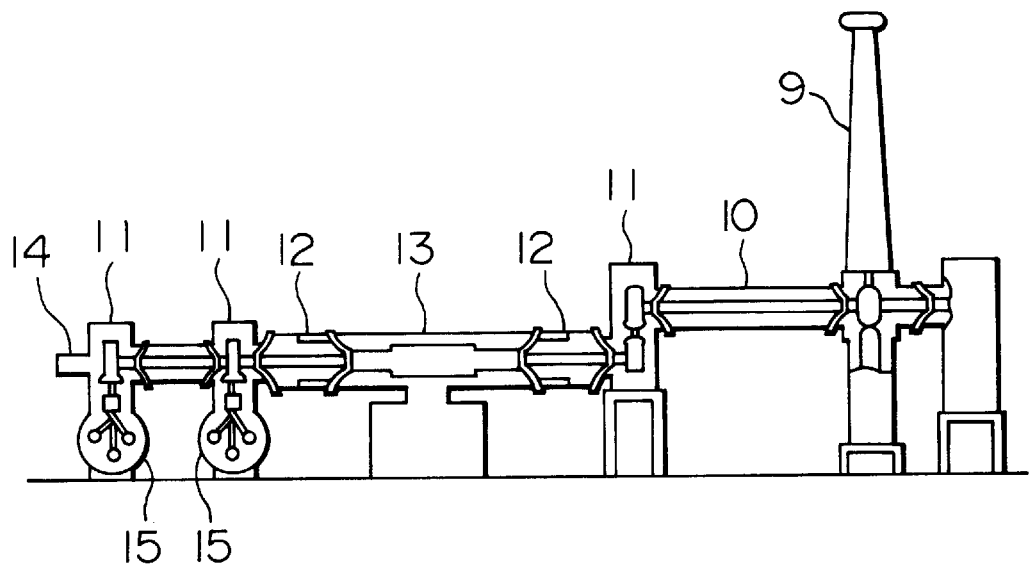
FIG. 5 is a fragmentary sectional view of a gas insulated switchgear according to still another embodiment of the present invention.

FIG. 5 show a gas insulated switchgear (GIS) according to the present invention. The GIS includes a bushing 9, a connecting bus 10, disconnecting device 11, a current transformer 12, a circuit breaker 13, a grounding device 14, and a main but 15. The busing 9, and insulator cylinders of the disconnecting device 11 and the circuit breaker 13 employ the same structure as the above-mentioned insulator spacer.

Recently, the insulator spacer has been required to present a higher heat radiation performance. As a capacity of a power line is enlarged, a capacity of the gas insulated switchgear is also enlarged. A required current capacity becomes 8000A or more. The conductor applied with a high voltage is permitted to rise up to 105° C. If a temperature of the conductor rises beyond 110° C., an organic base material of the insulator spacer, such as epoxy resin, is thermally deteriorated. In case that the current capacity is 8000A or less, the device is dimensioned by taking an insulation performance into consideration. Therefore, there is a thermal allowance, and then a temperature of the conductor of a high voltage does not rise beyond 100° C. even when a rated current is supplied thereto.

To the contrary, in case that the current capacity is 8000A or more, the device is dimensioned by taking a thermal performance into consideration. Therefore, a temperature of the conductor of a high voltage rises up to 105° C. when a rated current is supplied thereto. In this case, since there is a connecting conductor of high voltage in the insulator spacer, it is readily heated up to a high temperature as compared with the remaining part. Therefore, it is required to make a heat radiation performance of the insulator spacer better than that of the insulating gas. Namely, it is required to enhance a heat transfer coefficient of the insulator spacer. To this end, it is preferable to add an inorganic material of high heat transfer coefficient, such as boron nitoride (BN), as a filler to an epoxy resin base. The heat transfer coefficient of the boron nitoride is high (about 60 W/m·° C.) and the dielectric constant thereof is low (about 4.2). Therefore, the dielectric constant of the insulator spacer is reduced, thereby preventing electrostatic concentration due to the shape of the insulator spacer from occurring.

The reasons why the advantages in the dielectric strength and in the heat radiation performance of the insulator spacer are caused by reducing the dielectric constant of the insulator spacer and increasing the heat transfer coefficient thereof will be described hereinafter.

Figure 6:
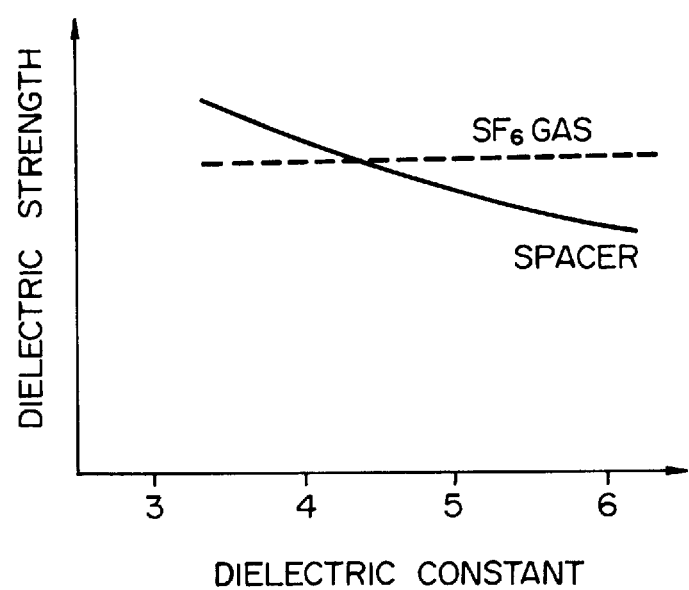
FIG. 6 is a graph showing a relationship between the dielectric constant of the insulator spacer and the dielectric strength of the device.

In connection with the improvement of the dielectric strength, as apparent from FIG. 6, the dielectric strength on the surface of the insulator spacer represented by a solid line is increased as the dielectric constant thereof is reduced. The broken line represents a dielectric strength of $SF_6$ gas. In case that the dielectric constant of the insulator spacer is about 5.5, the dielectric strength of the insulator spacer is lower than that of $SF_6$ gas. Accordingly, the dielectric strength of the whole device substantially depends on the dielectric strength of the surface of the insulator spacer. In order to ensure enough insulation distance, the device cannot help being enlarged. To the contrary, if the dielectric constant of the insulator spacer is reduced, the dielectric strength of the insulator spacer is increased. When the dielectric constant of the insulator spacer is about 5.0 or less, the dielectric strength of the insulator spacer becomes substantially equal to or more than that of $SF_6$ gas, thereby improving the dielectric strength of the whole device without being enlarged.

In order to reduce the dielectric constant of the insulator spacer, it is preferable to add a filler of low dielectric constant to the base material of the insulator spacer. The reasons will be described hereinafter referring to FIG. 7.

Figure 7:
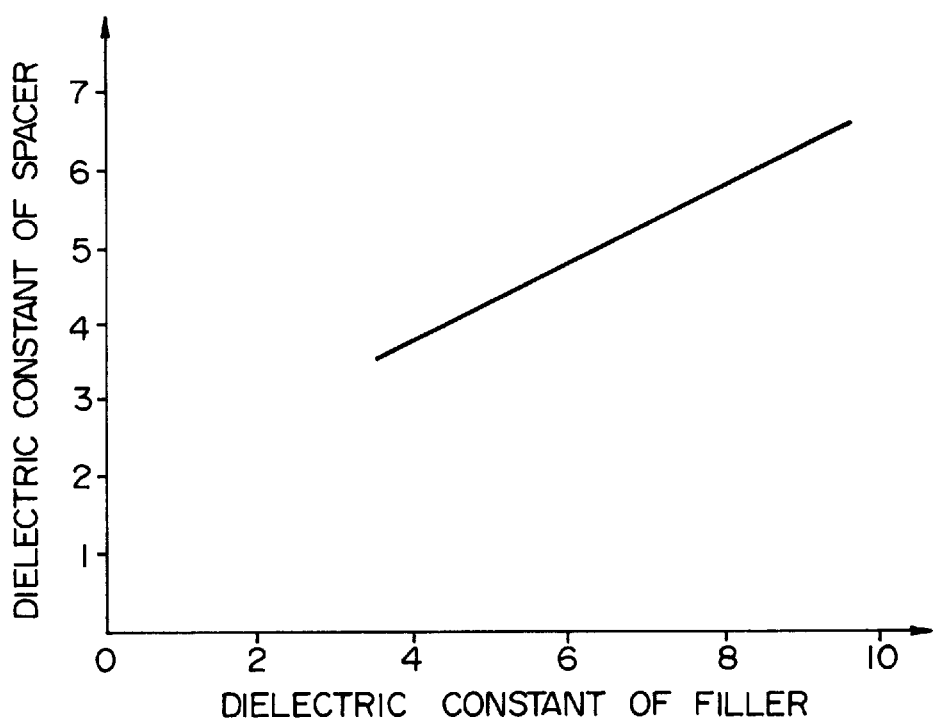
FIG. 7 is a graph showing a relationship of the dielectric constants between the filler and the insulator spacer.

FIG. 7 shows a relationship in the dielectric constant between the filler and the insulator spacer in case that the filler is added at 50 volume % to the epoxy resin base material of the insulator spacer. As apparent from FIG. 7, as the dielectric constant of the filler is reduced, the dielectric constant of the insulator spacer is linearly reduced. It is found that the dielectric constant of the filler is required to be maintained under 6.5 so as to reduce the dielectric constant of the insulator spacer below 5.0. The material of the filler of such low dielectric constant may be aluminium fluoride (electric constant 5.0) or mica (dielectric constant 6.2).

In connection with the improvement of the heat radiation performance, the explanation will be described hereinafter with reference to FIG. 1.

The conductors 2 and 4 generating heat due to high power consumption are cooled by the natural convection heat transfer of the insulating gas. In this case, while the heat generated in the conductors 2 is directly transferred to the insulating gas, the heat generated in the conductor 4 is first transferred to the insulator spacer 3 and then transferred into the insulating gas through the surface of the insulator spacer 3.

If the insulator spacer 3 has a sufficient high heat conductivity, it can serve as a heat radiator, thereby the temperature of the conductor 4 is reduced lower than that of the insulator gas. To the contrary, if the heat conductivity of the insulator spacer 3 is low, the heat radiation performance of the insulator spacer 3 becomes lower than that of the insulating gas. Accordingly, the temperature of the conductor 4 becomes higher than that of the insulating gas.

The heat transfer coefficient $\alpha g$ from the conductor 2 to the insulating gas varies according to the kinds, temperature, pressure of the insulating gas and the constitution of the device. In an ordinary gas insulated switchgear, since the temperature of the insulating gas is between room temperature and 100° C., and the pressure thereof is between 1 atm and 5 atm, the heat conductivity $\alpha g$ is between 1 W/m·° C. and 5 W/m·° C. To the contrary, the overall heat transfer coefficient as from the conductor 4 to the insulating gas through the insulator spacer 3 is represented by the following equation.

$$\alpha s = \lambda_s \cdot \eta_f / H$$

Where $\lambda_s$ is a heat conductivity of the insulator spacer, H is a distance from inside to outside of the insulator spacer, and $\eta_f$ is a heat radiation coefficient of the insulator spacer, which is determined according to the shape and the heat conductivity of the spacer 3 and to the heat transfer coefficient of the insulating gas. The value of $\eta_f$ is always not greater than 1, and in the ordinary gas insulated switchgear, it is about 1. The value of H is usually between 0.1 m and 0.2 m. In order to make the heat radiation performance of the insulator spacer 3 higher than the heat transfer coefficient of the insulating gas, it is required to make the overall heat transfer coefficient higher than the heat transfer coefficient from the conductor 2 to the insulating gas, namely $\alpha s > \alpha g$. To this end, taking into consideration the values of $\alpha s$, $\eta_f$, and H, the value of $\lambda_s$ is required to be 1 W/m·° C. or more.

The $\lambda_s$ is determined according to the heat conductivity $\lambda_m$ of the base material of the insulator spacer 3, the heat conductivity $\lambda_f$ of the filler added to the base material of the insulator spacer 3 and the amount $V_f$ of the added filler (volume %). Generally, $\lambda_m$ is about 0.22 W/m·° C., and $\lambda_f$ is usually larger than $\lambda_m$. Therefore the heat conductivity of the insulator spacer is enhanced by means of adding the filler.

Figure 8:
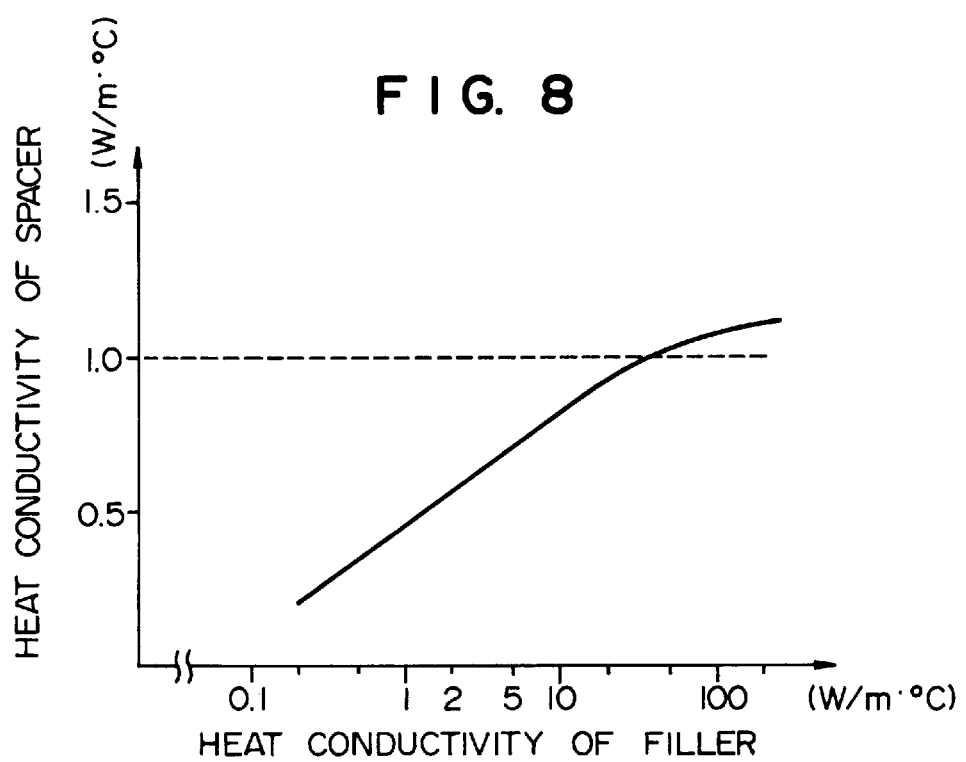
FIG. 8 is a graph showing a relationship of the heat transfer coefficients between the filler and the insulator spacer.

The relationship between the heat conductivities of the filler and the insulator spacer will be described hereinafter with reference to FIG. 8 shows the relationship therebetween in case that the filler is added by 50 volume %. As apparent from FIG. 8, the higher the heat conductivity $\lambda_f$ of the filler becomes, the higher the heat conductivity $\lambda_s$ of the insulator spacer becomes. However, in case that the heat conductivity $\lambda_f$ of the filler becomes 30 W/m·° C., the heat conductivity of the insulator spacer is saturated above 1 W/m·° C. This saturation is caused by the base resin material of the insulator spacer which serves as a thermal barrier.

Accordingly, in order to make the heat conductivity $\lambda_s$ of the insulator spacer 3 higher than 1 W/m·° C., the heat conductivity $\lambda_s$ of the filler must be higher than 30 W/m·° C. In this case, the overall heat transfer coefficient becomes higher than the heat transfer coefficient from the conductor 2 to the insulating gas, namely $\alpha s > \alpha g$. Accordingly, the heat radiation performance becomes greater than the heat transfer performance of the insulating gas.

As described above, if the heat conductivity of the filler is made to be higher than 30 W/m·° C., the heat radiation performance becomes greater than the heat transfer performance of the insulating gas, and then the temperature of the conductor 4 becomes lower than that of the conductor 2. Accordingly, even though the temperature of the conductor 2 rises up to 105° C., the temperatures of the conductor 4 and the insulator spacer 3 are maintained below 105° C., so that the insulator spacer 3 is prevented from being deteriorated.

Therefore, in case that the insulating material, whose dielectric constant is 5 or less and heat conductivity is 1 W/m·° C. or more, is used for the insulator spacer 3, not only the dielectric strength of the insulator spacer 3 but also the heat radiation performance is enhanced, and then the current capacity of the gas insulated switchgear is enlarged over 8000A.

Such insulating material can be obtained by adding a filler having a dielectric constant of 6.5 or less and a heat conductivity of 30 W/m·° C. or more to an organic base material such as epoxy resin.

FIG. 9 shows the relationship between the dielectric constant and the heat conductivity of the various additives. As apparent from FIG. 9, the filler which satisfies the above-mentioned requirements (6.5 or less dielectric constant and 30 W/m·° C. or more heat conductivity) is boron nitride (BN). The mixture of boron nitride and alumina or aluminium fluoride can be employed as such filler.

According to the present invention, even though conductive foreign matter adhered to the insulator member of the gas insulated switchgear, the dielectric strength thereof is prevented from being deteriorated, thereby obtaining a gas insulated switchgear of high voltage, large capacity and high reliability.

What is claimed is:

1. A gas insulated switchgear comprising:
   a container which is filled with an insulating gas;
   a conductor disposed within said container; and
   an insulator for supporting said conductor in said container,
wherein said insulator includes an organic substance base and an inorganic material filler including an aluminum fluoride added to said organic substance base, said inorganic material filler having a mean diameter of 15 μm or less, said insulator having a smooth outer peripheral surface, an arithmetical mean deviation from a mean line of a profile of said smooth surface being 15 μm or less.

2. A gas insulated switchgear according to claim 1, wherein said filler is atomised.

3. A gas insulated switchgear according to claim 1, wherein said inorganic material includes a mixture of an aluminium fluoride and an alumina.

4. A gas insulated switchgear according to claim 1, wherein said insulator includes a coating layer for providing the smooth outer peripheral surface.

5. A gas insulated switchgear according to claim 4, wherein said coating layer is made of epoxy resin.

6. A gas insulated switchgear according to claim 1, said insulator having a dielectric strength at an outer periphery thereof equal or greater than that of said insulating gas, and a heat transfer coefficient from said conductor to said insulator being greater than that from said conductor to said insulating gas.

7. A gas insulated switchgear according to claim 6, wherein said inorganic material filler has a dielectric constant less than 6.5 and a heat transfer coefficient greater than 30 W/m·° C.

8. A gas insulated switchgear according to claim 1, wherein said organic substance base is made of a thermosetting resin.

9. A gas insulated switchgear according to claim 8, wherein said thermosetting resin is an epoxy resin.

* * * * *